United States Patent [19]

McCoy

[11] Patent Number: 4,932,253

[45] Date of Patent: Jun. 12, 1990

[54] ROD MOUNTED LOAD CELL

[76] Inventor: James N. McCoy, 5001 Ditto La., Wichita Falls, Tex. 76301

[21] Appl. No.: 346,166

[22] Filed: May 2, 1989

[51] Int. Cl.$^5$ ............................................. E21B 47/00
[52] U.S. Cl. .................................... 73/151; 73/862.54
[58] Field of Search ............... 73/151, 862.54, 862.56, 73/862.65; 177/255; 166/250, 65.1, 66

[56] References Cited

U.S. PATENT DOCUMENTS

| | | | |
|---|---|---|---|
| 1,585,634 | 5/1926 | Axelson | 73/862.54 |
| 2,741,915 | 4/1956 | Renken et al. | 73/151 |
| 3,355,938 | 12/1967 | Neely et al. | 73/141 |
| 3,527,094 | 9/1970 | Yew et al. | 73/862.54 |
| 3,965,736 | 6/1976 | Welton et al. | 73/151 |
| 4,090,405 | 5/1978 | McKee | 73/151 |
| 4,644,785 | 2/1987 | Doyle | 73/151 |

OTHER PUBLICATIONS

Interface, Ic., "Loadtrol" Load Cell, 1985.

*Primary Examiner*—Hezron E. Williams
*Assistant Examiner*—Kevin D. O'Shea
*Attorney, Agent, or Firm*—Richards, Medlock & Andrews

[57] ABSTRACT

A load cell is mounted on a polished rod between a rod clamp and a hanger bar. The polished rod is connected to a string of sucker rods that drive a reciprocating pump for lifting fluid from a borehole. The load cell includes a tubular body which is fitted with strain gauges for measuring compressional forces applied to the cell. The ends of the tubular body are shaped with annular spherical surfaces which mate with corresponding surfaces on washers at each end. Each of the washers tightly surrounds the polished rod and as a result of the loading on the polished rod, the washers and rod are forced into coaxial alignment with the load cell. Optionally, the polished rod can receive a centralizing sleeve which forces it to be centered within the tubular body of the load cell or the washers at either end thereof. As a result of the centralized placement of the polished rod, the loading across the cross sectional area of the load cell is made substantially uniform thereby enhancing the operation and life of the load cell.

18 Claims, 3 Drawing Sheets

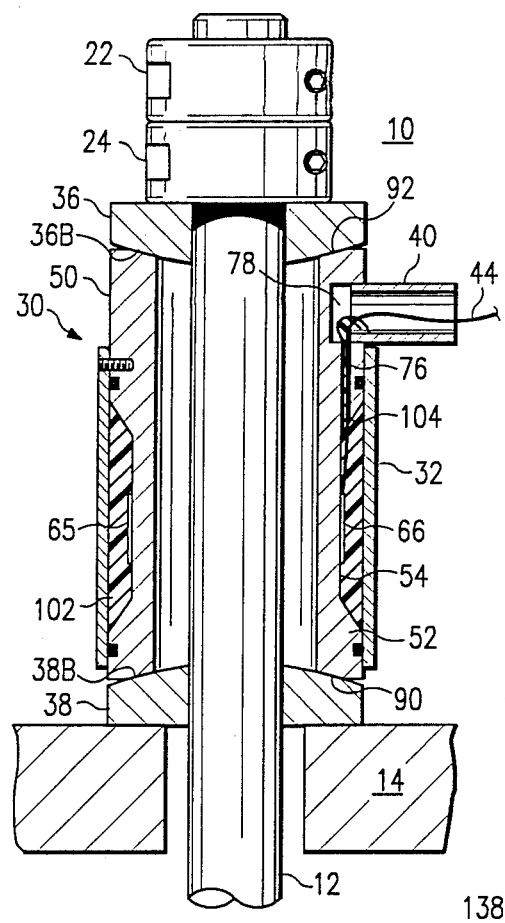
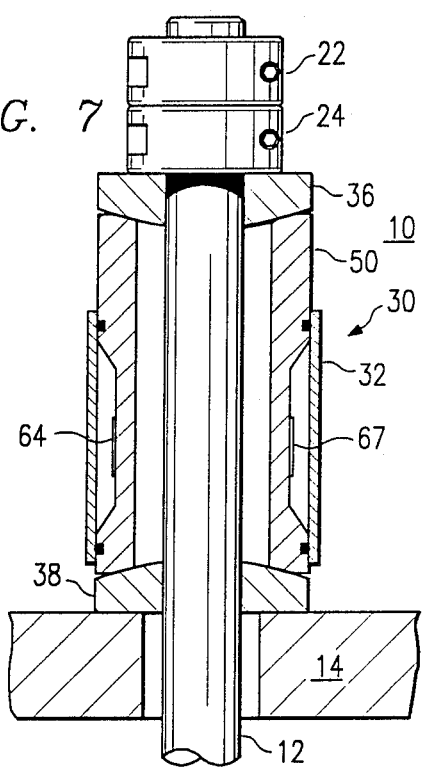
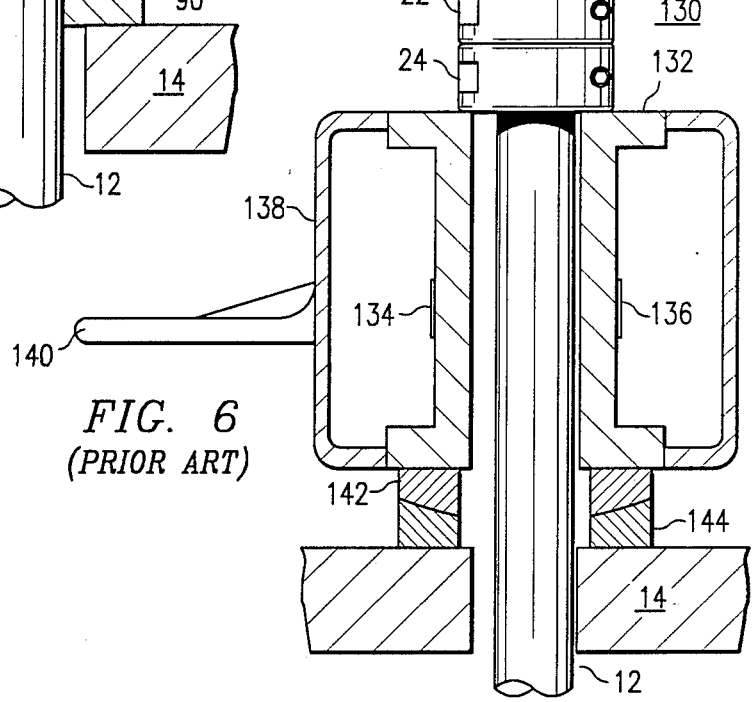
FIG. 4
FIG. 7
FIG. 6
(PRIOR ART)

ROD MOUNTED LOAD CELL

TECHNICAL FIELD OF THE INVENTION

The present invention pertains in general to oil field testing and production equipment and in particular to a load cell for measuring the forces on a polished rod which drives a reciprocating fluid pump.

BACKGROUND OF THE INVENTION

The conventional technique for pumping oil from underground reservoirs utilizes a reciprocating downhole pump. At the surface, a motor drives a walking beam which has connected at one end a polished rod and a string of sucker rods which extend down into the borehole for connection to the pump. As the motor runs, the walking beam raises and lowers the string of sucker rods which causes the pump to lift the fluid from the reservoir up to the surface.

A number of different occurrences can take place at the bottom hole location of the pump. The fluid level may draw down to the level of the pump, the pump can become jammed with sand or the pump can become defective. There also could be other downhole problems. Often, the conditions at the pump can be determined by measuring the load on the sucker rod. It is therefore important in well production to determine the load on the sucker rod to control when the well is pumped or to notify an operator when there is a problem that requires action.

The load on the sucker rod can be measured by use of a load cell which has a strain gauge. One such use of a strain gauge load cell for making a load measurement on a sucker rod is shown in U.S. Pat. No. 4,090,405 to McKee. This patent shows a segmented device which is clamped to the rod and has gripping surfaces above and below the strain gauge for transferring rod load to the device for stressing the strain gauge. U.S. Pat. No. 3,355,938 to Neely et al. describes a load cell which includes a jack. This load cell is mounted on the rod between a hanger bar and rod clamp. A screw mechanism is provided for transferring load to a pair of load cells which include strain gauges. A still further device is a load cell made by Interface Inc. of Scottsdale, Ariz. This is referred to as a LoadTrol (TM) load cell. This cell is installed on the polished rod above the hanger bar and below the rod clamp. As this device is compressed, the strain gauge mounted on the device measures the applied load.

A significant problem in the use of rod mounted load cells is the uneven application of the load to the body of the cell. The strain gauges are typically mounted in pairs on opposite sides of the body of the load cell. It has typically been the case that the load has not been uniformly applied to the load cell. For a load cell mounted between a hanger bar and a rod clamp, it is unusual to have a hanger bar which is perfectly level. Likewise, the rod clamps, and any intervening washers, are often not square to the top of the load cell. In addition, the polished rod itself likely is off center from the load cell. Any of these configurations can cause an unequal application of force to the load cell. When this occurs, certain of the strain gauges will be heavily loaded while other of the strain gauges will have reduced or very light loading. Strain gauges must be calibrated against a known load and the operation of the gauges is typically not linear. Thus, if a uniform calibration load is applied to a cell and the output of the strain gauges measured and compared to the load, it is unlikely that a similar size load unequally applied to the cell will produce the same output from the strain gauges. Thus, to obtain accurate information, it is important that the load on the rod be uniformly applied about the load cell.

A further problem of unequal loading is that the lifetime of components such as strain gauges and connecting wires can be substantially reduced if they are overloaded.

Therefore, there exists a need for a load cell which provides even loading across the cell.

SUMMARY OF THE INVENTION

A selected embodiment of the present invention comprises a load cell for measuring the load on a rod which drives a reciprocating pump located in a borehole wherein the rod extends through a hanger bar and is secured with a rod clamp. The load cell includes a tubular body which has an annular, radially sloping surface on at least one end of the body. This surface can be in a concave spherical shape. The tubular body has a central opening for receiving the rod. A washer is provided which has an annular, radially sloping surface that mates with the annular surface of the tubular body. The washer likewise has an interior opening for receiving the rod. At least one strain gauge is mounted on a lateral surface of the tubular body for detecting distortion of the tubular body due to the load on the rod. The tubular body and the washer are mounted on the rod between the hanger bar and the rod clamp wherein the annular surface on the washer mates with the annular surface on the tubular body and serve to center the rod within the tubular body of the load cell.

In a still further embodiment of the present invention there is provided a load cell which likewise measures the load on a rod which drives a pump located in a borehole. This load cell includes a tubular body which has a central opening for receiving the rod and the central opening has a greater width than the diameter of the rod. A sleeve is provided for mounting on the rod wherein the sleeve is located either within the central opening of the tubular body, and substantially fills the space between the outer surface of the rod and the inner surface of the tubular body, or between the inner surface of a washer and the outer surface of the rod. At least one strain gauge is mounted on a lateral surface of the tubular body for detecting distortion of the tubular body due to the load on the rod. The tubular body and the sleeve are mounted on the rod between the hanger bar and the rod clamp wherein the sleeve functions to center the rod within the tubular body of the load cell thereby equalizing the load force applied to the load cell.

BRIEF DESCRIPTION OF THE DRAWINGS

For a more complete understanding of the present invention and the advantages thereof, reference is now made to the following description taken in conjunction with the accompanying drawings in which:

FIG. 4 is a sectional view taken along lines 4—4 for the load cell shown in FIG. 1.

FIG. 6 is an illustration of a prior art load cell showing uneven loading of the cell due to off center positioning of the polished rod, FIG. 7 is a sectional view of an embodiment of the present invention illustrating that the washers of the present invention tend to align themselves centrally with the tubular body of the load cell due to the mating, annular, curved services of the washer and tubular body, in contrast to the prior art cell shown in FIG. 6.

DETAILED DESCRIPTION

Figure 1:
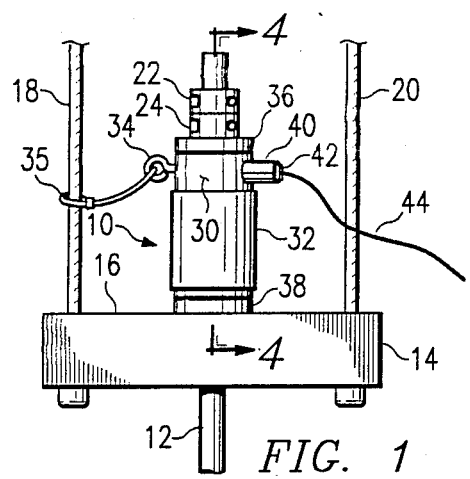
FIG. 1 is an elevation view of a hanger bar and polished rod as used for the pumping of an oil well together with a load cell in accordance with the present invention.

Referring to FIG. 1, there is shown a load cell 10 which is mounted on a polished rod 12. Rod 12 extends through a hanger bar 14. The bar 14 has an upper surface 16 which receives the load cell 10. Cables 18 and 20 support the hanger bar 14. Rod clamps 22 and 24 are secured to the upper end of the polished rod 12 above the load cell 10.

The load cell 10 includes a tubular body 30 and a cylindrical sleeve 32. An eye-hook 34 is mounted to the body 30 and connected by a line 35 to cable 18 to prevent rotation of the load cell 10 about the rod 12. The load cell 10 further includes an upper washer 36 and lower washer 38. A fitting 40 is mounted to the tubular body 30 and includes a socket 42 for receiving an electrical cable 44. The electrical cable 44 is connected to strain gauges (shown in FIG. 2) mounted on the lateral walls of the body 30 within the sleeve 32.

In operation, the load cell 10 is mounted between the rod clamp 24 and the hanger bar 14. Thus, the load on the rod 12 is applied compressively to the load cell 10. This load includes the weight of the pump, the sucker rod string and the fluid which is lifted by the pump. The magnitude of this load is indicated by the output signals from the strain gauges in the load cell. As the hanger bar is reciprocated vertically, the rod 12 raises and lowers the pump which is located downhole in the well. The load on the rod 12 can change depending upon the downhole conditions. Should the pump become fouled with sand, the load will substantially increase. If the pump begins to hit the surface of the fluid (pounding) there will further be a distinctive loading characteristic. During normal operations when the pump is submerged in fluid, there will be a distinct loading condition during each cycle of reciprocation. There will be a heavy loading on the upstroke when the pump lifts the fluid column and a lesser load when the pump is on the downstroke. Thus, substantial information about downhole conditions can be learned by monitoring the load on the rod 12. In one specific application, the loading can indicate when the fluid level has been pumped down to the pump and therefore the pumping action should be stopped until additional fluid flows into the borehole. After a given length of time, the pumping action can be resumed and, if adequate fluid is present, the pumping will continue until it is again detected that the fluid level has dropped to a level where pumping should cease. Thus, the measurement of load on the rod 12 can be used for control of production as well as to detect any abnormal downhole conditions.

Figure 2:
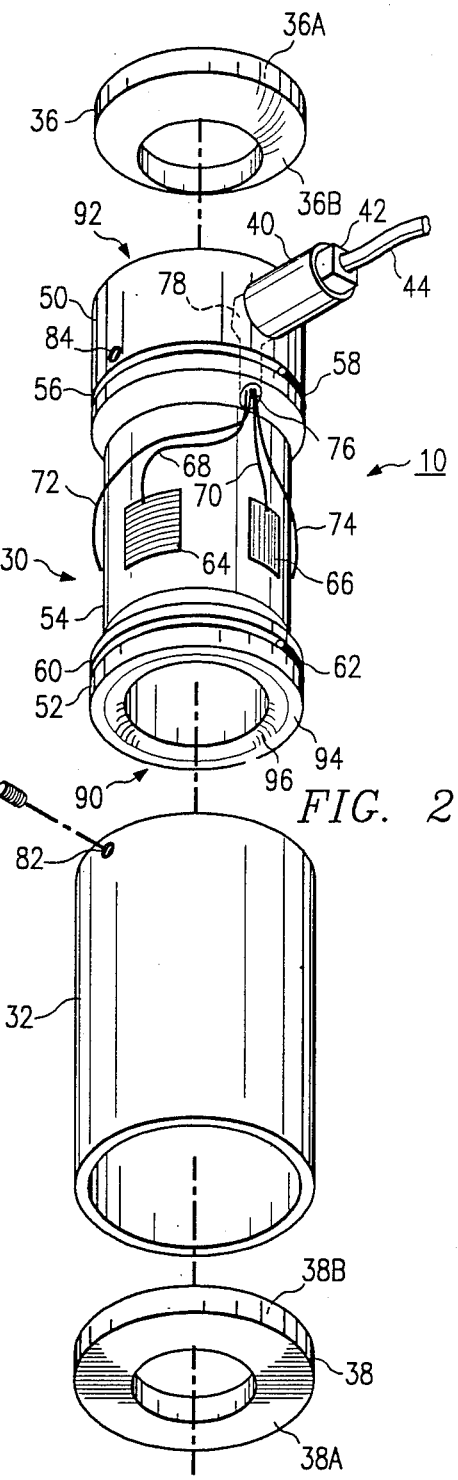
FIG. 2 is an exploded view of the components making up one embodiment of the load cell of the present invention.

Referring now to FIG. 2, there is illustrated an exploded view of the load cell 10 in accordance with one embodiment of the present invention. The tubular body 30 includes an upper shoulder 50, a lower shoulder 52 and a reduced diameter section 54. The shoulder 50 is provided with an O-ring slot 56 which receives an O-ring 58. Likewise, the lower shoulder 52 is provided with an O-ring slot 60 which receives an O-ring 62. Selected dimensions for the body 30 are length of 3.0 inches, outer diameter 2.0 inches, inner diameter 1.3 inches, and reduced section 54 diameter 1.575 inches.

The body 30, sleeve 32 and washers 36 and 38 are preferably 17-4 stainless steel.

Four strain gauges are mounted uniformly around the lateral surface of the section 54 of tubular body 30. Illustrated are strain gauges 64 and 66 and two equivalent strain gauges 65, 67 are positioned on the opposite side of the section 54. A selected embodiment of the strain gauges 64, 65, 66 and 67 is a model N2A-06-S054Y-350 manufactured by Measurement Groups, Inc. of Raleigh, N.C.

The strain gauges 64 and 66 have respective wires 68 and 70 for connection to the strain gauges. Each of these wires typically has four leads. The two remaining strain gauges, not shown, are connected to wires 72 and 74. The collection of the wires 68–74 pass through a hole 76 which extends to an opening 78 that receives the fitting 40. The wires 68–74 thus extend through the hole 76, the opening 78 and the fitting 40 for connection to the cable 44.

Figure 3:
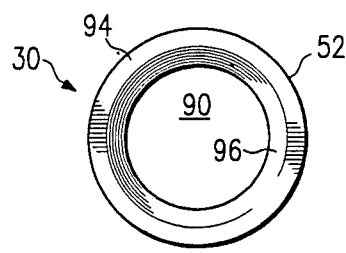
FIG. 3 is a planar view of one end of the tubular body portion of the load cell shown in FIG. 1.

The sleeve 32 encompasses the O-rings 58 and 62. Sleeve 32 is secured to the tubular body 30 by means of in set screw 80 which passes through a hole 82 in a sleeve 32 and into a hole 84 in the shoulder 50. The O-rings 58 and 62 provide a hermetic seal between the sleeve 32 and the tubular section 54. An annular chamber is formed between the sleeve 32 and the section 54. This chamber is filled with liquid silicone which adheres to the interior surfaces and components therein and protects the strain gauges 64, 65, 66 and 67 together with the connecting wires 68–74. The tubular body 30 has a lower end face 90 and an upper end face 92. The face 90 is further illustrated in FIG. 3. Face 90 includes a flat annular surface 94 and a radially sloping inner annular surface 96. The inner surface 96 slopes downward from the inner periphery of the surface 94 toward the center of the tubular body 30. In a preferred embodiment, the surface 96 is a portion of a spherical surface having a 3.0 inch radius. The upper face 92 of the tubular body 30 has the same shape as the lower face 90.

Further referring to FIG. 2 the washer 36 has a flat surface 36A and the opposing face has a convex sloped surface 36B. The surface 36B is preferably an annular segment of a spherical surface having a radius of 3.0 inches so that it mates with the surface 96. The washer 38 likewise has a flat surface 38A and a curved surface 38B. The surfaces 38A and 38B correspond to the surfaces 36A and 36B respectively. Thus, the surface 38B mates with the curved surface 96 of face 90. Likewise, surface 36B mates with a corresponding surface of face 92.

An additional function of the washer 38 and face 90 is to accommodate a non-level hanger bar 14. Similarly, the washer 36 and face 92 can compensate for non-level rod clamps, such as 22 and shown in FIG. 2.

In addition to spherical, the surface 36B and corresponding surface on face 92 could have other sloping shapes, such as conical. However, spherical is preferred because it provides better non-level compensation.

Referring to FIG. 4, there is illustrated a section view of the load cell 10 taken along lines 4—4 shown in FIG. 1. The rod 12 extends through the center of the tubular body 30. As noted above, an annular chamber is formed between the sleeve 32 and the inner reduced diameter section 54. This annular chamber is filled with silicone 102 to protect strain gauges 64, 65, 66 and 67 from moisture, air, shock and direct contact. Gauge 65 is connected to wire 72 shown in FIG. 2.

The hole 76 receives the wires 68–74 which are potted within the hole 76 with epoxy 104. The epoxy 104 is applied into the hole 76 and extends into the opening 78 prior to the installation of the silicon 102. The epoxy 104 serves to secure the wires 68–74 in place and to seal the hole 76.

Note in FIG. 4 that the diameter of the hole in the washer 36 is only slightly greater than the diameter of the polished rod 12. The difference is only a few thousandths of an inch. Likewise, the diameter of the hole in the washer 38 is only slightly greater than the diameter of the polished rod 12. However, the interior diameter of the tubular body 30 can be substantially greater than that of the polished rod 12 so that it may be used with a variety of rod diameters. When the load cell 10 is loaded, typically with thousands of pounds of force, the sloped surfaces on the washers 36 and 38 and on the corresponding faces 90 and 92 force the washers 36 and 38 into coaxial alignment with the tubular body 30, thereby bringing the rod 12 also into coaxial alignment with the tubular body 30. Thus, this configuration produces centralized loading by the rod 12 on the load cell 10. The spherical surfaces also accommodate non-level rod clamps and a non-level hanger bar.

Figure 5A:
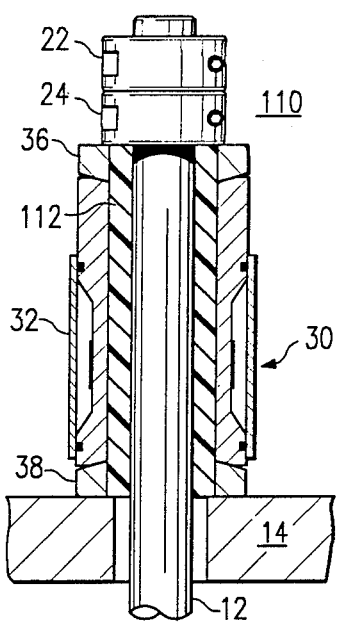
FIG. 5A is a sectional view of a further embodiment of the present invention wherein a sleeve is applied to the polished rod between the tubular body and washers of a load cell to serve the function of centering the polished rod within the load cell.
Figure 5B:
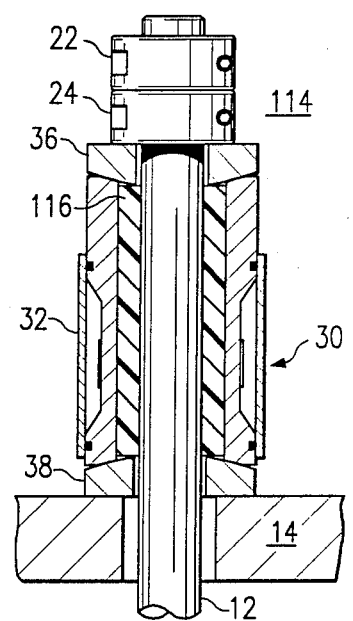
FIG. 5B is a sectional view of a further embodiment of the present invention wherein a sleeve is positioned between the interior of the tubular body and the polished rod.
Figure 5C:
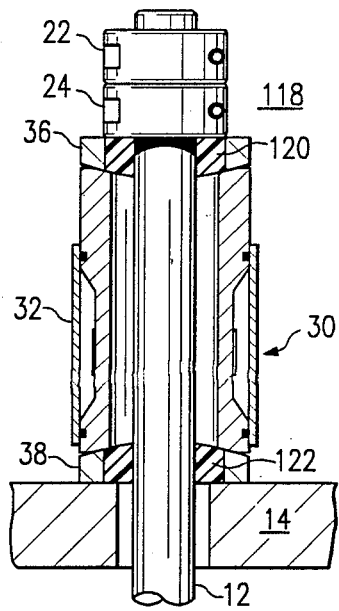
FIG. 5C is a sectional view of a further embodiment of the present invention wherein a sleeve is positioned between each washer and the polished rod.

Referring now to FIGS. 5A–5C, there are shown three alternative embodiments of the present invention. In FIG. 5A there is shown a load cell 110 which includes a centralizing sleeve 112. The sleeve 112 surrounds the polished rod 12 and fills the space between the exterior of the polished rod 12 and the interior of the cylindrical opening in the tubular body 30. The sleeve 112 extends throughout the length of tubular body 30 and through each of the washers 36 and 38. In this embodiment, the washers 36 and 38 have the diameter of the holes therein greater than the diameter of the rod 12 and large enough to at least accommodate the sleeve 112. The interior washer diameter may even be greater than that of the outside diameter of the sleeve 112. In the load cell 110, the sleeve 112 provides the function of centralizing the rod 12 within the center of the body 30 to insure that the load provided by the rod 12 is centered on the load cell 110. The centering accomplished by use of the sleeve 112 is carried out independently of any centering function provided by the washers 36 and 38.

Referring to FIG. 5B, there is shown a load cell 114 having a sleeve 116. In this embodiment, the sleeve 116 is positioned only within the tubular body 30 and its ends terminate before meeting the washers 36 and 38. The sleeve 116 does not extend into the interiors of the washers 36 and 38. The sleeve 116 fills the space between the exterior of the rod 12 and the interior surface of the tubular body 30. The sleeve 116 has a uniform thickness so it centralizes the rod 12 within the tubular body 30. In this embodiment, the interior openings for the washers 36 and 38 need not necessarily correspond to the diameter of the rod 12.

Referring to FIG. 5C, there is shown a load cell 118 which includes sleeves 120 and 122. The sleeve 120 is effectively a washer which is positioned within the hole in the washer 36. The diameter of the hole in the washer 36 substantially corresponds to the diameter of the sleeve 120. The sleeve 122 likewise fits within the hole in the washer 38. The sleeves 120 and 122 serve the function of centering the washers 36 and 38 on the rod 12 and the washers 36 and 38 force the tubular body 30 to be centered on the rod 12 by virtue of the curved surfaces on the washers 36 and 38 and corresponding faces 90 and 92 on the tubular body 30.

The sleeves 112, 116, 120 and 122 are preferaby a plastic such as PVC.

Referring to FIG. 6, there is illustrated a prior art load cell 130. A representative example of such a cell is a model 1923WX-30K manufactured by Interface, Inc. The load cell 130 includes a spool-like central body 132, strain gauge sensors 134 and 136 (typically eight sensors are provided spaced equilaterally about the body 132). The cell 130 further includes a housing 138 and antirotaion arm 140. Below the body 132 and above the hanger bar 14 there is provided a spherical washer 142 and a bearing plate 144. The mating spherical surface between washer 142 and plate 144 accommodates non-level positioning of the hanger bar 14 but does not provide any centralizing action with respect to the rod 12 and body 132. The rod 12 is secured with rod clamps 22 and 24. Note in FIG. 6 that the rod can be set off center in position almost against one side of the interior of the body 132.

A test has been conducted with a load cell, such as 130, shown in FIG. 6. In the test device, the body 132 had an overall outside diameter of 2⅞", an internal diameter of 1⅜" and an overall length of 4". The rod 12 had a diameter of 1". With the rod 12 positioned virtually against one side of the interior of the body 132 above a strain gauge, a force of 15,000 lbs. was applied to the rod 12. Measurements were then made to indicate loading as reflected by the strain gauges 134 and 136. The signal from strain gauge 136 indicated that in excess of 90% of the load was being carried on the right hand portion of the body 132. The strain gauge 134 indicated that less than 10% of the load was being carried on the left hand portion of the body 132. Thus, it can be seen that off-center positioning of the rod 12 on the load cell can dramatically distort the loading on the cell.

Referring to FIG. 7, there is shown a section view of the load cell 10 in accordance with the present invention. Upon application of a 30,000 pound load to the rod 12, it has been determined that the outputs from the strain gauges 64 and 67 are essentially equal thereby indicating uniform loading of the load cell 10. As discussed above, the configuration of the load cell 10 forces the axis of the rod 12 to be aligned with the axis of the load cell 10. This coaxial alignment provides uniform loading.

Figure 8:
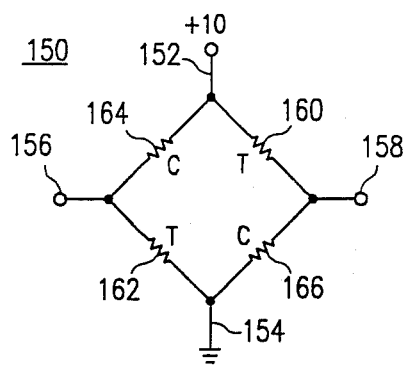
FIG. 8 is an electrical schematic for the strain gauges described herein.

Referring now to FIG. 8, there is represented an electrical schematic 150 for the strain gauges such as 64, 65, 66 and 67. These strain gauges are connected in a bridge configuration wherein the resistivity of the elements is a function of the applied stress or strain. A 10 volt signal is applied between terminal 152 and ground terminal 154. Output signals are measured at terminals 156 and 158. A tension sensor element 160 is connected between terminals 152 and 158. A tension sensor element 162 is connected between terminals 156 and 154. A compression sensor element 164 is connected between terminals 152 and 156 and a further compression sensor element 166 is connected between terminals 158 and 154. The strain gauges are bonded to the surface of the reduced diameter section 54 by use of an adhesive in a conventional manner. When the section 54 (shown in FIG. 2) is subjected to force, such as tension, compression or rotation, the sensor elements 160-166 change the resistivity thereof and alter the output signal produced at the terminals 156 and 158. These signals can be calibrated by test loads for absolute measurements or can be used directly.

Typically, the sensor elements 160 and 166 are fabricated on a common foil for attachment to a circuit. Likewise, the elements 162 and 164 are on a common foil. When the elements 160-166 are connected as shown, the output signal is taken at terminals 156 and 158. When a force is applied to the body 30, the voltage at one of the terminals 156, 158 will increase and the voltage at the other of the terminals will decrease in substantially the same magnitude. Thus, the output is a differential signal. The sensor elements comprise small metal elements that are either tensioned or compressed by the attached body. Compression decreases the resistance of the element while tension increases the resistance of the element. Each of the gauges 64-67 has two elements in it, one element for compression, one for tension. Therefore the cell 10 has two of the bridges shown in FIG. 8.

Referring to FIGS. 1 and 2, in operation, the load cell 10 is mounted on the rod 12 between the hanger bar 14 and the rod clamps 22 and 24. The washers 36 and 38 have interior openings which are very close to the diameter of the rod 12. These openings are only a few thousandths of an inch greater than the diameter of the rod 12. When the full load on the rod 12 is applied across the load cell 10, the force of this load is applied between the surface 36B of the washer 36 and the face 92 of the tubular body 30. The shape of the mating spherical surfaces causes the washer to be driven to the center of the body 30 so that the washer 36, the rod 12 and the body 30 are coaxially aligned. The load force on the rod 12 is likewise carried through the interface of the washer 38 and the lower face 94. A similar action takes place which drives the washer 38 and rod 12 into coaxial alignment with the tubular body 30. Thus, the rod 12 is centered within the load cell 10, thereby insuring that the load on the rod 12 is uniformly applied transversely across the tubular body 30. The alignment of the present invention could be provided by either of the top or bottom combinations of sloped, spherical surfaces, but the preferred embodiment includes the alignment mechanism at both the top and bottom of the load cell.

Referring to FIGS. 5A, 5B and 5C, the alignment of the rod 12 coaxially with the tubular body 30 is provided by the sleeve 112 in load cell 110, the sleeve 116 in load cell 114 and the sleeves 120 and 122 within the load cell 118.

The centralized, and equalized, transverse loading across the load cells of the present invention provide numerous advantages over the prior art load cells which do no inherently provide such alignment and equalization. In field use, load cells of this type are subjected to intense compressive forces and on occasion can be subjected to intense overload forces. Load cells are rated for average measurement force and include a maximum overload force rating. If the cell is overloaded, it is forced beyond its yield point and suffers permanent distortion thereby destroying the effectiveness of the cell. As described above, unequal loading on the load cell can result in the application of almost the entire load on approximately half of the overall cell. Under such a situation, it is possible that the localized loading may exceed the yield point for the material of the cell in that area even though the overall load on the cell is less than the rated maximum load. The cell can thus be destroyed even though it is never subjected to a total overall load in excess of its rated capacity. By centralizing and equalizing the load as set forth in the present invention, this hazard is avoided.

A further problem encountered in unequal loading of load cells is that the strain gauges do not necessarily produce linear outputs. If accurate outputs are to be produced, it is preferable to have the gauges loaded uniformly. However, it is possible to achieve a relatively accurate gross measurement by placing multiple strain gauges, such as eight, about the load cell and produce a summation from these strain gauges. This requirement increases the cost of the load cell by requiring additional strain gauges. The use of a plurality of strain gauges leads to a still further problem with regard to the life of the load cell. The load cells are typically used in adverse environmental conditions, namely extremes of heat, cold, moisture and impact. If any one of the multiple strain gauges fails, then the load cell itself becomes defective. It can therefore be seen, that as the number of strain gauges is increased, the probability of early failure is increased.

A still further problem with uneven loading of a load cell is that the lifetime of strain gauge elements and the connecting wires is an inverse function of the load. However, this is typically not a linear relationship. If the load is doubled, the lifetime of a component could be reduced by as much as a factor of ten. Therefore, unequal loading can dramatically reduce the lifetime of a load cell.

Although the present invention has been described in reference to the oil field environment, it may equally be employed in any application requiring the detection or measurement of compressive or tension forces.

Although several embodiments of the invention have been illustrated in the accompanying drawings and described in the foregoing detailed description, it will be understood that the invention is not limited to the embodiments disclosed, but is capable of numerous rearrangements, modifications and substitutions without departing from the scope of the invention.

I claim:

1. A load cell for measuring the load on a rod which drives a reciprocating pump located in a borehole wherein the rod extends through a hanger bar and is secured with a rod clamp, comprising:
   a tubular body having an annular, radially sloping surface on at least one end thereof, said tubular body having a central opening for receiving said rod, a washer having an annular, radially sloping surface for mating with said annular, radially sloping surface of said tubular body, said washer having an interior opening for receiving said rod therein, a strain gauge mounted on a lateral surface of said tubular body for detecting distortion of said tubular body due to the load on said rod, and said tubular body and said washer for mounting on said rod between said hanger bar and said rod clamp wherein the annular surface of said washer mates with the annular surface of said tubular body for centering said rod within said tubular body of said load cell.

2. A load cell as recited in claim 1 wherein said radially sloping surfaces have a spherical shape.

3. A load cell as recited in claim 1 wherein said tubular body has said annular, sloping face on both ends thereof and there is included a second washer similar to the first washer wherein the second washer has the annular surface thereof mated to the annular surface on a second end of said tubular member.

4. A load cell as recited in claim 1 wherein the end of said tubular body having said annular surface further has an annular, planar surface having the interior periphery thereof contiguous with the outer periphery of said annular, sloping surface on said end of said tubular body.

5. A load cell as recited in claim 1 wherein the interior diameter of said washer is approximately the diameter of said rod.

6. A load cell for measuring the load on a rod which drives a reciprocating pump located in a borehole wherein the rod extends through a hanger bar and is secured with a rod clamp, comprising:

a tubular body having an annular, concave spherical surface formed on at least one end thereof, said tubular body for receiving said rod therethrough, a washer having an annular, convex spherical surface shaped to mate with said concave spherical surface on said tubular body, said washer having an interior opening for receiving said rod therein, a strain gauge mounted on a lateral surface of said tubular body for detecting distortion of said tubular body due to the load on said rod, and said tubular body and said washer for mounting on said rod between said hanger bar and said rod clamp wherein the convex spherical surface on said washer mates with the concave spherical surface of said tubular body for centering said rod within said tubular body of said load cell.

7. A load cell as recited in claim 6 wherein said tubular body has said annular, spherical, concave surfaces on both ends thereof and including a second washer similar to said first washer wherein the annular surface of the second washer mates to the annular surface on the second end of said tubular body.

8. A load cell for detecting the load on a rod which drives a reciprocating pump located in a borehole wherein the rod extends through a hanger bar and is secured with a rod clamp, comprising:

a body for receiving said rod therein,
means for centralizing said rod within said body,
a strain gauge mounted on said body, and
said body and said means for centralizing positioned on said rod between said hanger bar and said rod clamp for applying the load on said rod across said body for detecting said load by operation of said strain gauge.

9. A load cell as recited in claim 8 wherein said means for centralizing comprises a portion of a spherical surface in one end of said body for mating with a spherical surface on a washer which is mounted on said rod.

10. A load cell as recited in claim 8 wherein said means for centralizing comprises a sleeve mounted on said rod for centering said rod coaxially with said load cell.

11. A load cell for measuring the load on a rod which drives a pump located in a borehole wherein the rod extends through a hanger bar and is secured with a rod clamp, comprising:

a tubular body having a central opening therein for receiving said rod therethrough, said central opening having a greater width than the diameter of said rod, a sleeve for mounting on said rod, said sleeve for location within said central opening of said tubular body, a strain gauge mounted on a lateral surface of said tubular body for detecting distortion of said tubular body due to the load on said rod, and said tubular body and said sleeve for mounting on said rod between said hanger bar and said rod clamp wherein said sleeve centers said rod within said tubular body of said load cell.

12. A load cell as recited in claim 11 wherein said sleeve does not extend beyond said tubular body.

13. A load cell for measuring the load on a rod which drives a pump located in a borehole wherein the rod extends through a hanger bar and is secured with a rod clamp, comprising:

a tubular body having an annular, radially sloping surface on at least one end thereof, said tubular body having a central opening therein for receiving said rod therethrough, said central opening having a greater width than the diameter of said rod, a washer having an annular, radially sloping surface for mating with the surface on the end of said tubular body, said washer for receiving said rod therein;

a sleeve for mounting on said rod within said washer, said sleeve having an interior diameter approximately equal to the diameter of said rod and an exterior diameter approximately equal to the diameter of the hole in said washer;

a strain gauge mounted on a lateral surface of said tubular body for detecting distortion of said tubular body due to the load on said rod, and said tubular body, said washer, and said sleeve for mounting on said rod between said hanger bar and said rod clamp wherein said washer and said sleeve centers said rod within said tubular body of said load cell.

14. A load cell for detecting the load on a rod which drives a reciprocating pump located in a borehole wherein the rod extends through a hanger bar and is secured with a rod clamp, comprising:

a tubular body having a reduced diameter center section which defines upper and lower shoulders, said body for receiving said rod therethrough, at least one strain gauge mounted on the exterior surface of said center section of said tubular body, a cylindrical sleeve for placement on the exterior of said tubular body encompassing said center section and portions of said upper and lower shoulders for defining an annular chamber between said sleeve and said center section of said tubular body, at least one end of said tubular body having a face with an annular surface having a radial slope, a washer having an interior diameter substantially equal to the diameter of said rod and having a face with an annular surface having a radial slope which mates with the annular surface of said face of said tubular body, and said tubular body and said washer mounted on said rod between said rod clamp and said hanger bar with said annular surfaces mating with each other wherein said rod is forced by said washer into coaxial alignment with said tubular body and wherein the loading on said rod is substantially applied longitudinally to said tubular body and said loading is detected by said strain gauge.

15. A load cell as recited in claim 14 including a passageway extending longitudinally through one of said shoulders for passing wires therethrough for connection to said strain gauge.

16. A load cell for measuring a load applied by an extending member, comprising:

a tubular body having an annular, radially sloping surface on at least one end thereof, a washer having an annular, radially sloping surface on one face thereof for mating with said annular surface on said tubular body and an interior opening for closely fitting on said extending member, a strain gauge mounted on a lateral surface of said tubular member for detecting distortion of said tubular member, and said tubular body for mating the annular surface thereof with the annular surface of said washer, said washer mounted on said member wherein said load is transmitted from said extending member through said washer to said tubular body and wherein said washer drives said tubular body into coaxial alignment with said extending member.

17. A load cell as recited in claim 16 wherein said annular surfaces are sections of a spherical surface.

18. A load cell as recited in claim 16 wherein said tubular body has said annular, radially sloping surfaces on both ends thereof and including a second of said washers for mating with the second end of said tubular body.

* * * * *

UNITED STATES PATENT AND TRADEMARK OFFICE
CERTIFICATE OF CORRECTION

PATENT NO.   :   4,932,253
DATED        :   June 12, 1990
INVENTOR(S)  :   James N. McCoy It is certified that error appears in the above-identified patent and that said Letters Patent is hereby corrected as shown below:

Col. 4, line 44, please delete the first occurrence of the word "in" and substitute therefor the word -- a --.

Col. 4, line 44, please delete the second occurrence of the word "a".

Col. 5, line 8, please delete the words "shown in FIG. 2" and substitute therefor -- 24 (shown in FIG. 1) --

Signed and Sealed this

Eleventh Day of May, 1993

Attest:

MICHAEL K. KIRK

Attesting Officer

Acting Commissioner of Patents and Trademarks